United States Patent
Kotake et al.

(10) Patent No.: US 7,626,596 B2
(45) Date of Patent: Dec. 1, 2009

(54) IMAGE REPRODUCING METHOD AND APPARATUS FOR DISPLAYING ANNOTATIONS ON A REAL IMAGE IN VIRTUAL SPACE

(75) Inventors: Daisuke Kotake, Kanagawa (JP); Akihiro Katayama, Kanagawa (JP); Yukio Sakagawa, Tokyo (JP); Takaaki Endo, Chiba (JP); Masahiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 10/988,615

(22) Filed: Nov. 16, 2004

(65) Prior Publication Data

US 2005/0116964 A1 Jun. 2, 2005

(30) Foreign Application Priority Data

Nov. 19, 2003 (JP) ............................. 2003-389659

(51) Int. Cl.
 G09G 5/00 (2006.01)
(52) U.S. Cl. ...................................... 345/632; 345/633
(58) Field of Classification Search ................ 345/632, 345/633, 619, 672, 418; 715/512, 700, 763, 715/711, 712, 715
See application file for complete search history.

(56) References Cited

U.S. PATENT DOCUMENTS

| 2003/0080975 A1 | 5/2003 | Kuroki et al. ............... 345/629 |
| 2003/0142115 A1 | 7/2003 | Endo et al. .................. 345/633 |
| 2006/0195858 A1 * | 8/2006 | Takahashi et al. ............. 725/19 |

OTHER PUBLICATIONS

Bell et al., View Management for Virtual and Augmented Reality, Nov. 2001, ACM Symposium on User Interface Software and Technology, pp. 101-110.*
Tenmoku et al., A Wearable Augmented Reality System for Navigation Using Positioning Infrastructures and a Pedometer, 2003, IEEE and ACM International Symposium on Mixed and Augmented Reality, pp. 1-2.*
Harmon et al., The Virtual Annotation System, 1996, IEEE, pp. 239-246.*
Takaaki Endo et al., "Building Image-Based Cybercities by Using Vehicle-Mounted cameras," Mixed Reality Systems Laboratory, Inc., The Society Conference of the Institute of Electronics, Information and Communication Engineers (IEICE), PA-3-4, 1997, pp. 276-277.
Takaaki Endo et al., "Building Image-Based Cybercities by Using Vehicle-Mounted Cameras (1)—Considerations on Cameras and 3D Sensors," Proceedings of the Virtual Reality Society of Japan, Second Annual Conference, vol. 2, Sep. 1997, pp. 63-66, English Abstract.

(Continued)

*Primary Examiner*—Kee M Tung
*Assistant Examiner*—Jacinta Crawford
(74) *Attorney, Agent, or Firm*—Fitzpatrick, Cella, Harper & Scinto

(57) ABSTRACT

In an image reproducing method capable of displaying annotations in virtual space constituted by a group of real panoramic images, if an object for which an annotation is to be displayed falls within the field of view at the position of the observer, the object is adopted as the display position of the annotation. If the object is not within the field of view, then the direction of forward travel of the observer is adopted as the annotation display position. If the object is in a state of transition, then the annotation display position is decided by interpolation.

7 Claims, 14 Drawing Sheets

OTHER PUBLICATIONS

Takaaki Endo et al., "Building Image-Based Cybercities by Using Vehicle-Mounted Cameras (2)—Generation of Wide-Range Virtual Environment by Using Photorealistic Images-," Proceedings of the Virtual Reality Society of Japan, Second Annual Conference, 1997, pp. 67-70, English Abstract.

* cited by examiner

FIG. 4A

| ID | FRAME NO. | CONNECTED ROADS | TWO-DIMENSIONAL COORDINATES ON MAP |
|---|---|---|---|
| C1 | n | R1,R2,R3 | (x1,y1) |
| C2 | n+m | R1,R4,R5 | (x2,y2) |

ATTRIBUTES OF DEMARCATION POINTS

FIG. 4B

| ID | DEMARCATION POINTS AT BOTH ENDS | FRAME NO. | TWO-DIMENSIONAL COORDINATES ON MAP |
|---|---|---|---|
| R1 | C1,C2 | n+1 | $(X_{n+1}, Y_{n+1})$ |
| | | n+2 | $(X_{n+2}, Y_{n+2})$ |
| | | ... | $(X_{n+2}, Y_{n+2})$ |
| | | n+m−1 | $(X_{n+m-1}, Y_{n+m-1})$ |

ATTRIBUTES OF ROADS

FIG. 8

| OBJECT | ROAD DISPLAYING ANNOTATION | DISPLAY METHOD |
|---|---|---|
| BUILDING A | R1 | FRONTAL |
|  | R2 | INTERPOLATION |
|  | R3 | OBJECT |
| BUILDING B | R2 | OBJECT |

DISTANCE TO OBJECT : LONG

DISTANCE TO OBJECT : SHORT

DISTANCE TO OBJECT : LONG

DISTANCE TO OBJECT : SHORT

DISTANCE TO OBJECT : LONG

DISTANCE TO OBJECT : SHORT

MAP

IMAGE REPRODUCING METHOD AND APPARATUS FOR DISPLAYING ANNOTATIONS ON A REAL IMAGE IN VIRTUAL SPACE

FIELD OF THE INVENTION

This invention relates to an image reproducing method and apparatus having a function for displaying annotations on a real image in virtual space constructed on the basis of real image data obtained by photography in real space.

BACKGROUND OF THE INVENTION

Attempts to express real space, in which imaging has been performed based upon real image data captured by a photographic device mounted on a mobile body, as virtual space through use of a computer have been disclosed in, for example, "Endo, Katayama, Tamura, Hirose, Watanabe, Tanigawa: 'Building Image-Based Cybercities by Using Vehicle-Mounted Cameras' (The Society Conference of the Institute of Electronics, Information and Communication Engineers (IEICE), PA-3-4, pp. 276 277, 1997), and "Endo, Katayama, Tamura, Hirose, Watanabe, Tanigawa: 'Building Image-Based Cybercities by Using Vehicle-Mounted Cameras (2) Generation of Wide-Range Virtual Environment by Using Photorealistic Images ' (Proceedings of the Virtual Reality Society of Japan, Second Annual Conference, pp. 67 70, 1997), etc.

A technique for reconstructing a geometric model of real space from real image data and expressing the model by conventional computer graphics can be mentioned as an example of a technique for expressing real space, which is obtained by capturing an image based upon real image data, as virtual space. However, there are limitations on the accuracy and realism of the model. Meanwhile, Image-Based Rendering (IBR) that expresses virtual space using real images without reconstructing a geometric model has become the focus of attention in recent years. The IBR technique is based upon real images and therefore makes it possible to express realistic virtual space. Further, a great amount of time and labor are required in order to create a geometric model of a broad space such as that of a city or town. An advantage of the IBR technique, however, is that such an expenditure of time and labor is unnecessary.

In order to construct walk-through virtual space using the IBR technique, it is necessary to generate and present an image that conforms to the position of the observer in the virtual space and the line-of-sight direction of the observer. In such a system, therefore, each image frame of the real image data and a position in the virtual space are stored in correspondence with each other, a corresponding image frame is acquired based upon the position of the observer in virtual space and the line-of-sight direction of the observer, and the acquired frame is reproduced.

In a walk-through within such virtual space, an image frame corresponding to each viewpoint position is stored as a panoramic image, which covers a range broader than the viewing angle at the time of reproduction, in such a manner that the observer can look along a desired direction at each viewpoint position. At the time of reproduction, the panoramic image is read out based upon the viewpoint position of the observer in virtual space and part of the image is cut from the panoramic image and displayed based upon the line-of-sight direction. In a case where the path of a viewpoint position in virtual space is the same as the path of a vehicle on which a photographic device has been mounted, the observer can experience the sensation of driving the vehicle himself.

By so arranging it that annotations such as the names of buildings are combined and displayed with the buildings in a displayed image in a walk-through within such virtual space, the observer can be provided with more valuable information. In addition, signs or the like that are difficult to see can be displayed in easily recognizable fashion as annotations on a real image.

However, when it is attempted to display an annotation on an object such as a building at all times in a walk-through constructed by the above-described IBR technique, the object for which display of the annotation is desired may be concealed by another object, and in such case which object the annotation belongs to cannot be identified. Alternatively, the correspondence between an annotation and an object may be misconstrued. Further, in a case where the distance between the viewpoint position in virtual space and the object is great, the object will appear small and hence there is the possibility that the object will be concealed by the annotation.

SUMMARY OF THE INVENTION

Accordingly, an object of the present invention is to prevent misrecognition of an object that is to be annotated, by changing the form of the annotation display in dependence upon the relationship between a viewpoint position and an object in virtual space.

According to one aspect of the present invention, there is provided an image reproducing method capable of displaying an annotation relating to an object in virtual space. The method comprises an acquisition step of acquiring annotation information that is for displaying an annotation, and definition information for defining a first zone, in which a first mode for causing the annotation to be displayed at a position that does not correspond to the location of the object is to be executed, and a second zone, in which a second mode for causing the annotation to be displayed at a position that corresponds to the location of the object is to be executed. The method also comprises a determination step of determining whether a viewpoint position of an observer lies in the first zone or in the second zone in accordance with the viewpoint position, and a display control step of causing the annotation to be displayed in the first mode if the viewpoint position has been determined to lie in the first zone by the determination step, and in the second mode if the viewpoint position has been determined to lie in the second zone by the determination step.

Also, according to another aspect of the present invention, there is provided an image reproducing method capable of displaying an annotation in virtual space. The method comprises an annotation display position deciding step of adopting a position that corresponds to the location of an object, for which an annotation is to be displayed, as the annotation display position in a first state in which the object falls within a field of view at the position of an observer. The method also comprises steps of adopting a prescribed position in the forward direction of the observer as the annotation display position in a second state in which the object does not fall within the field of view, and deciding the annotation display position by interpolation in a third state which is between the first state and the second state.

Furthermore, according to another aspect of the present invention, there is provided an image reproducing apparatus capable of displaying an annotation relating to an object in virtual space. The apparatus comprises a storage unit configured to store annotation information that is for displaying an annotation, and definition information for defining a first zone, in which a first mode for causing the annotation to be displayed at a position that does not correspond to the location of the object is to be executed, and a second zone, in which a second mode for causing the annotation to be displayed at a position that corresponds to the location of the object is to be executed. The apparatus also comprises a determination unit configured to determine whether a viewpoint position of an observer lies in the first zone or in the second zone in accordance with the viewpoint position. position and a display control unit configured to cause the annotation to be displayed in the first mode if the viewpoint position has been determined to lie in the first zone by the determination unit, and in the second mode if the viewpoint position has been determined to lie in the second zone by the determination unit.

In accordance with the arrangement described above, a user can recognize, easily and correctly, the correspondence between annotations and objects by changing the display position of an annotation in dependence upon the relationship between a viewpoint position and an object in virtual space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are diagrams illustrating an example of attributes of demarcation points and roads.

FIG. 8 is a diagram illustrating the storage format of annotation data.

DETAILED DESCRIPTION OF THE PREFERRED EMBODIMENTS

Preferred embodiments of the present invention will now be described in detail in accordance with the accompanying drawings.

First Embodiment

A virtual-space walk-through system according to a first embodiment of the invention will now be described. The walk-through system of this embodiment generates a panoramic image from real image data and stores the panoramic image in correlation with a map position that corresponds to a position in real space. The real image data is captured by a plurality of photographic devices mounted on a moving body such as an automobile. A walk-through in virtual space is achieved by generating image data from the stored panoramic image data in accordance with the viewpoint position (position on the map) and line-of-sight direction of the observer in virtual space.

Figure 1:
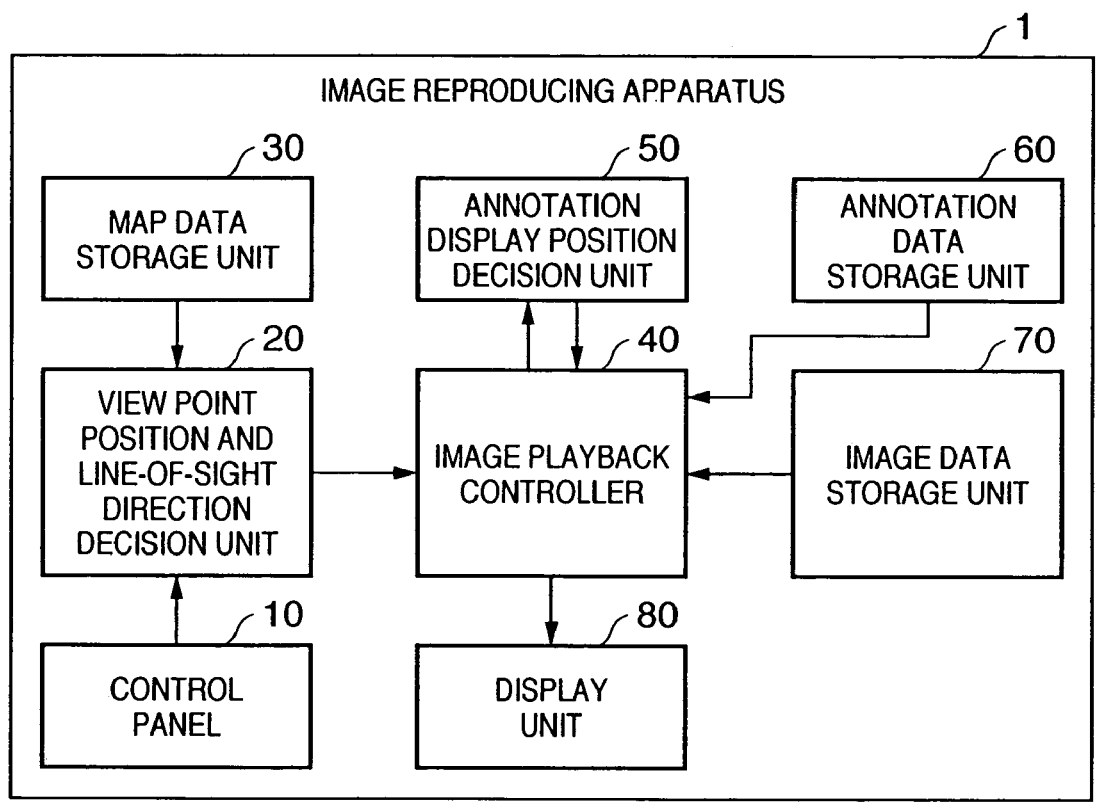
FIG. 1 is a block diagram describing the functional configuration of a walk-through system according to an embodiment of the present invention.

FIG. 1 is a block diagram for describing the functional configuration of the walk-through system according to this embodiment. An image reproducing apparatus 1 that constitutes the walk-through system includes a control panel 10, a viewpoint position and line-of-sight direction decision unit 20, a map data storage unit 30, an image playback controller 40, an annotation display position decision unit 50, an annotation data storage unit 60, an image data storage unit 70 and a display unit 80.

Figure 2:
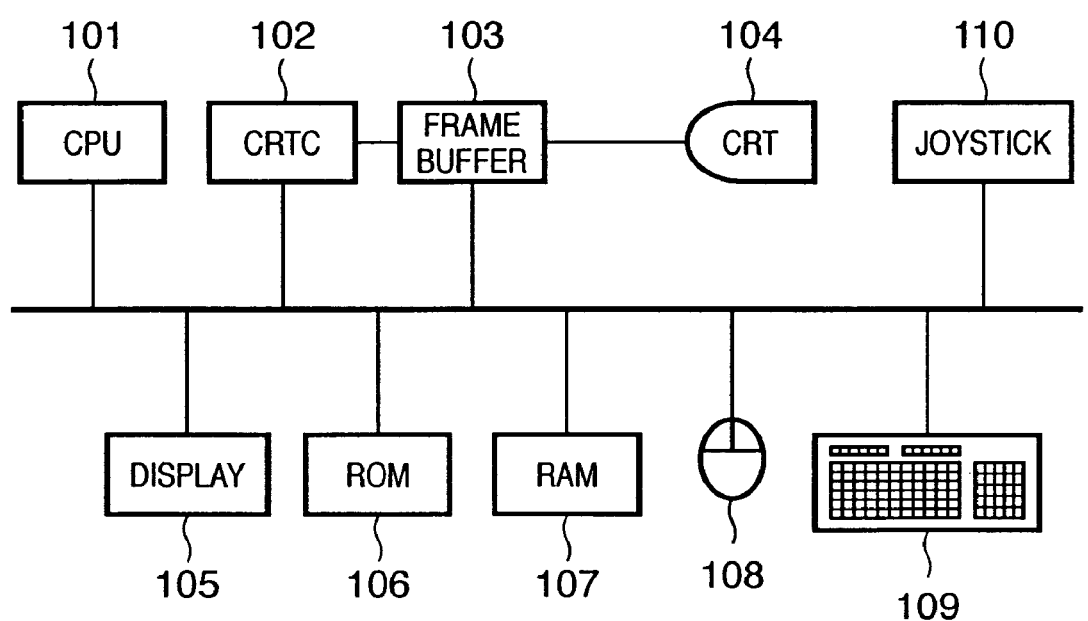
FIG. 2 is a block diagram illustrating the hardware implementation of an image reproducing apparatus according to the embodiment of FIG. 1.

FIG. 2 is a block diagram illustrating the hardware implementation of the image reproducing apparatus 1 according to this embodiment. The hardware implementation of FIG. 2 is equivalent to that of an ordinary personal computer. As shown in FIG. 2, a disk 105 is an external storage medium such as a hard disk or CD-ROM, and a CPU 101 is capable of reading the required data as necessary. The image data storage unit 70, map data storage unit 30 and annotation data storage unit 60 are implemented by the disk 105.

The CPU 101 functions as the decision unit 20, image playback controller 40 and annotation display position decision unit 50 by executing a program that has been stored in a ROM 106 or by loading a program, which has been stored on the disk 105 or in another external storage device (not shown), into a RAM 107 and then executing the program.

Further, by sending various display commands to a display controller (CRTC) 102, the latter presents various displays on a display device 104 using a frame buffer 103. The display controller 102, frame buffer 103 and a CRT 104 construct the display unit 80. In FIG. 2, a CRTC and a CRT are indicated as the display controller 102 and display device 104, respectively, of the display unit 80. However, the display device that can be utilized as the display unit 80 is not limited to a cathode-ray tube and a liquid crystal display device may be used as a matter of course.

A mouse 108, a keyboard 109 and a joystick 110 are for allowing the user to make inputs to the image reproducing apparatus 1 and construct the control panel 10.

The operation of the image reproducing apparatus 1 in the walk-through system of the first embodiment having the structure set forth above will be described next.

A viewpoint motion parameter and a line-of-sight rotation parameter are generated based upon operation of the mouse 108, keyboard 109 and joystick 110 of the control panel 10 by the user. According to the first embodiment, the joystick 110 is used in controlling the viewpoint position and line-of-sight direction. However, an input unit such as a game controller may be used just as well. The joystick 110 is capable of controlling the angle of inclination and angle of rotation of a stick independently. According to this embodiment, the operation that tilts the joystick 110 is made to correspond to movement of the viewpoint in virtual space, and the operation that rotates the joystick 110 is made to correspond to rotation of the line-of-sight direction.

The map data storage unit 30 stores two-dimensional map image data. On the basis of the motion parameter and rotation parameter from the control panel 10, the viewpoint position and line-of-sight direction decision unit 20 decides the viewpoint position and line-of-sight direction of the observer on a map image that has been stored in the map data storage unit 30. The image data storage unit 70 stores panoramic image data that corresponds to each position on the map. It should be noted that the image data storage unit 70 need not exist in the image reproducing apparatus 1 locally; it may be placed on a network and the image data may be read out of the storage unit via the network. The image playback controller 40 accepts the viewpoint position and line-of-sight direction of the observer on the map from the viewpoint position and line-of-sight direction decision unit 20 and reads the image data that corresponds to the viewpoint position out of the image data storage unit 70.

The form in which correlation data, which correlates viewpoint positions on the map and image data, is stored according to the first embodiment will now be described.

In this embodiment, movement of the observer is limited to a photographic path. Demarcation points are set as intersections (branch points) and corners, etc., and path of travel is expressed using these demarcation points and roads between two demarcation points. An ID is assigned to each demarcation point and road, panoramic images that have been captured at positions in real space are assigned to the corresponding demarcation points, and a group of panoramic images bracketed by panoramic images that have been assigned to demarcation point at both ends of a road is assigned to the road.

Figure 3:
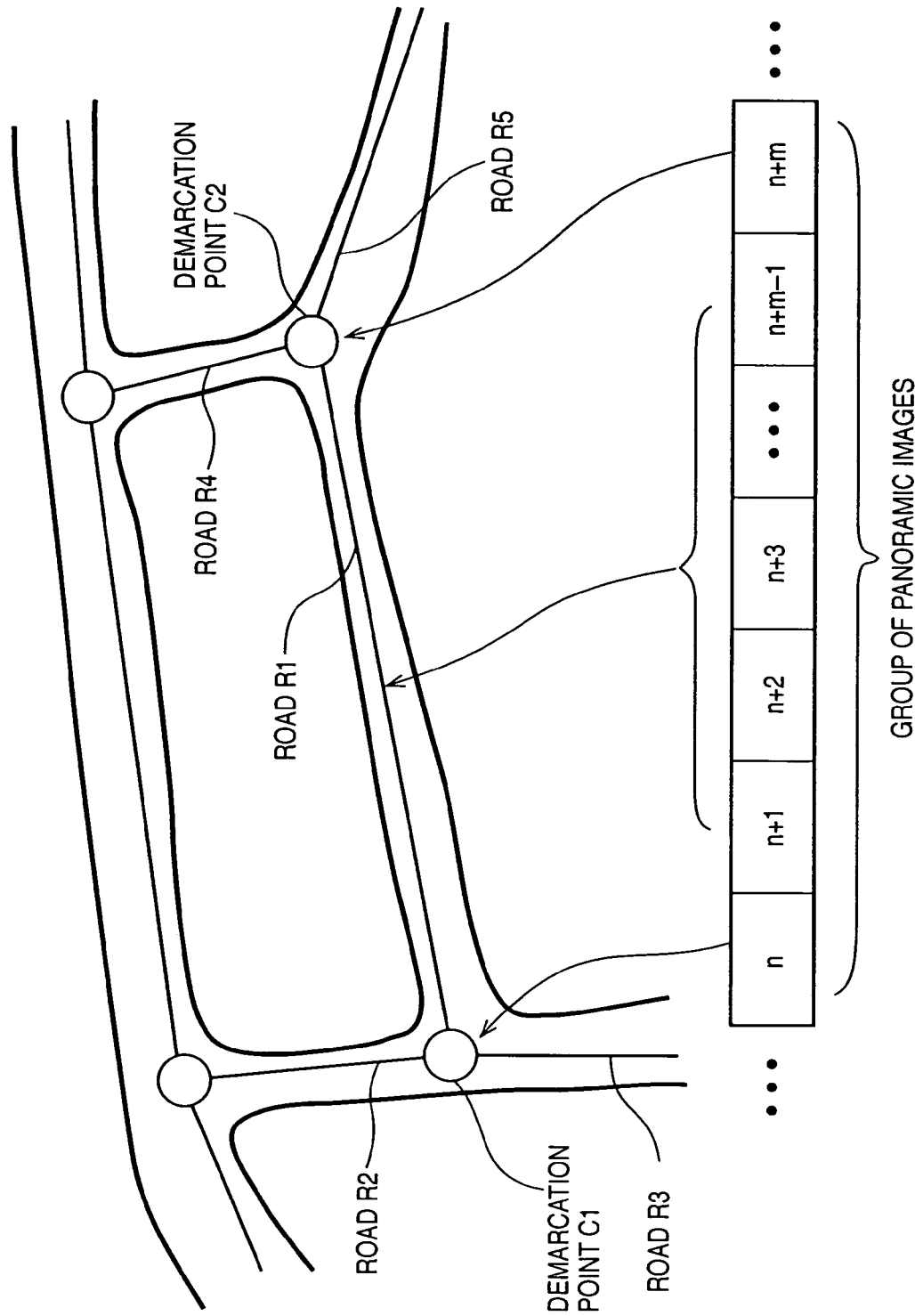
FIG. 3 is a diagram useful in describing a method of expressing virtual space in the embodiment of FIG. 1.

FIG. 3 is a diagram useful in describing the situation. In FIG. 3, an ID denoted R1 has been assigned to a line segment (road) bracketed by a demarcation point whose ID is C1 and a demarcation point whose ID is C2. Panoramic images corresponding to the demarcation points C1 and C2 are specified based upon GPS data or the like. As a result, a panoramic image of frame number n is assigned to demarcation point C1 and a panoramic image of frame number n+m is assigned to demarcation point C2. When the panoramic images are assigned to the demarcation points, a group of panoramic images from frame n+1 to frame n+m−1 is assigned automatically to road R1 bracketed by the demarcation points C1 and C2.

Further, as shown in FIG. 4A, each demarcation point has a corresponding panoramic image and two-dimensional coordinates on a map as attributes. Similarly, as shown in FIG. 4B, each road has corresponding panoramic images and two-dimensional coordinates of these panoramic images on a map. Although the two-dimensional coordinates of a panoramic image on the map are found from latitude and longitude obtained by GPS data, the coordinates may be found from image information utilizing computer vision techniques. Further, only the coordinates of the demarcation points at both ends may be obtained and two-dimensional coordinates of each of the panoramic images on the map included on the road between the demarcation points may be found by interpolation.

Furthermore, the image playback controller 40 applies viewpoint position on the map to the annotation display position decision unit 50. On the basis of the viewpoint position information received, the annotation display position decision unit 50 decides annotation display positions and applies the annotation display positions to the image playback controller 40. A method of deciding annotation display positions will be described later. The image playback controller 40 performs a projection conversion upon cutting out a panoramic image in conformity with the image displayed on the display unit 80, synthesizes an annotation image in accordance with the annotation display position and generates an image displayed on the display unit 80.

Figure 5:
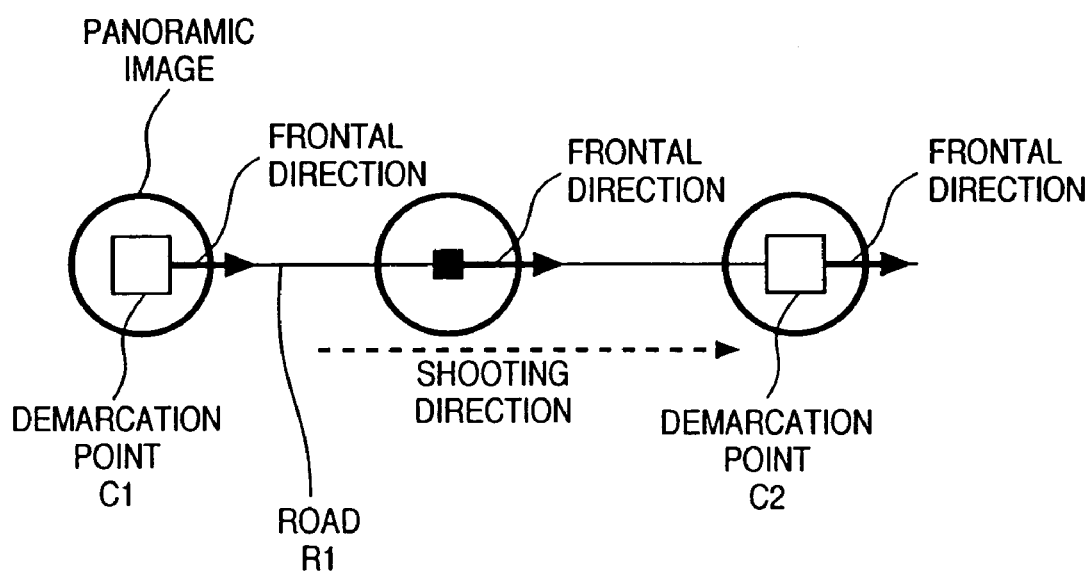
FIG. 5 is a diagram useful in describing correspondence between a panoramic image and road direction.

The operation of the annotation display position decision unit 50 will now be described in detail. As shown in FIG. 5, it is assumed in this embodiment that the direction in front of a panoramic image is the direction of the road, namely the travelling direction at the time of photography, on a road bracketed by demarcation points.

Figure 6:
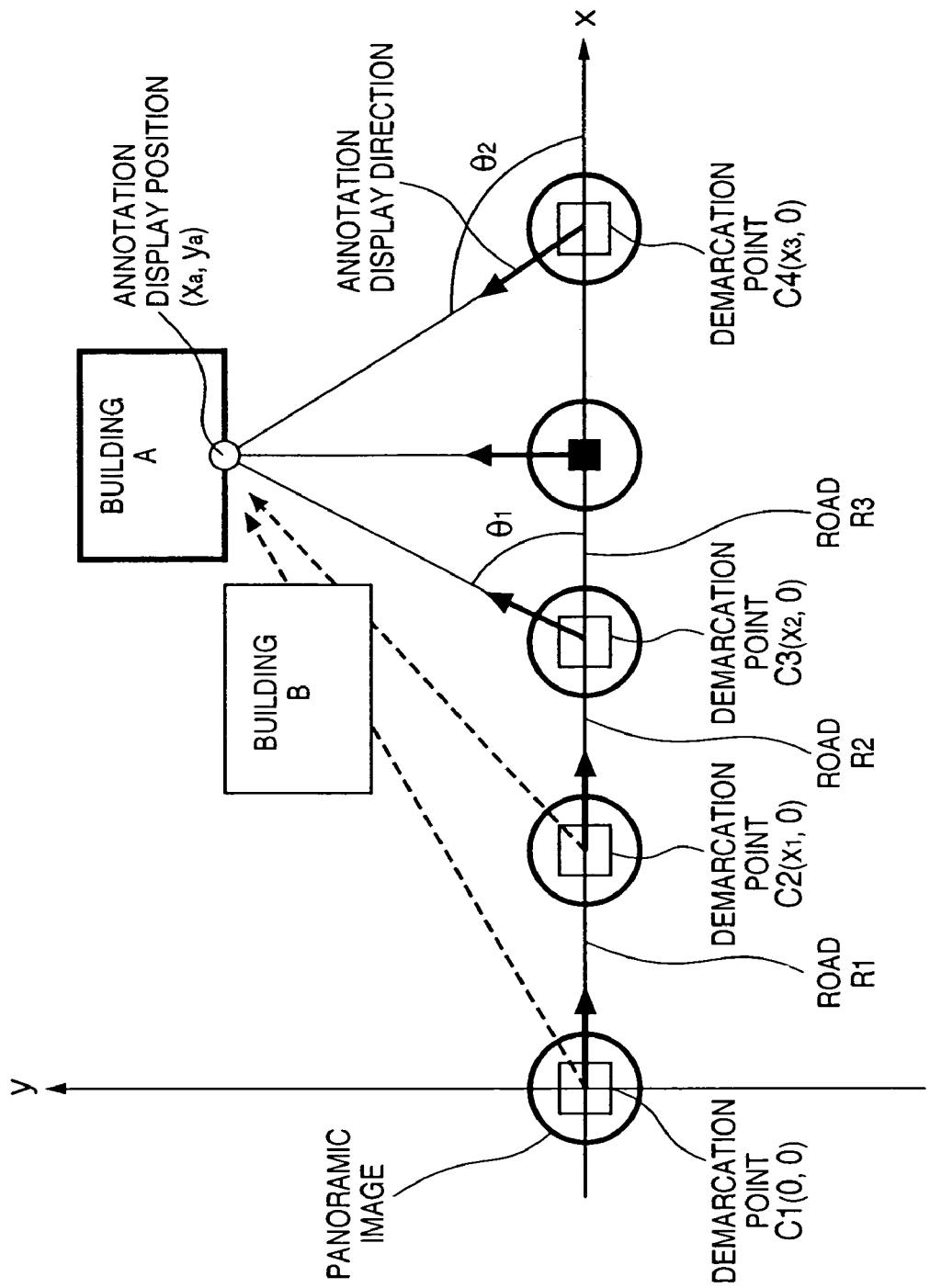
FIG. 6 is a diagram useful in describing a method of deciding annotation display position in an annotation display position decision unit.

FIG. 6 is a diagram useful in describing a method of deciding annotation display position in the annotation display position decision unit 50. Here an annotation relating to a building A is displayed between demarcation points C1 to C4.

According to this embodiment, three types of annotation display methods (referred to as a "frontal mode", "object mode" and "interpolation mode") are used selectively in accordance with the viewpoint position. For example, in a case where an annotation is displayed on the building A, the building A is hidden by a building B at demarcation points C1, C2 and on road R1, as indicated by the dashed lines in FIG. 6, and therefore the annotation comes to be displayed on the building B. Accordingly, at demarcation points C1, C2 and on road R1, the annotation relating to building A is displayed in the direction that is directly in front of the panoramic image, rather than in the direction of building A, in such a manner that the annotation relating to building A will not be displayed on building B. By thus displaying the annotation in the frontal direction, the annotation can be utilized as a signboard or road sign. This annotation display method is referred to as the frontal mode mentioned above.

Further, at demarcation points C3, C4 and on road R3, building A is not hidden by building B and therefore the annotation relating to building A is displayed on building A. This annotation display method is referred to as the object mode mentioned above. Furthermore, so that the annotation will be viewable continuously without suddenly vanishing, the annotation display direction is interpolated in such a manner that it gradually points toward building A from the frontal direction on road R2 extending from demarcation point C2 to demarcation point C3. This annotation display method is referred to as the interpolation mode mentioned above.

It should be noted that the demarcation points C1 to C4 are set manually by the user while the user plays back a real image. Specifically, the user sets the demarcation point C2 as the position at which the annotation display position should be changed from the frontal mode to the interpolation mode, and sets the demarcation point C3 as the position at which the annotation display position should be changed from the interpolation mode to the object mode. As a result of these settings, data of the kind shown in FIG. 8 is generated and stored in relation to the annotation. The details will be described later.

Furthermore, a method of deciding annotation display position will be described in detail. For the sake of simplicity, as shown in FIG. 6, demarcation point C1 is adopted as the origin and it is assumed that demarcation points C2, C3 and C4 all lie on the x axis (i.e., roads R1, R2 and R3 are all part of the x axis).

In FIG. 6, the coordinates of the position at which it is desired to display the annotation of building A are $(x_a, y_a)$. In regard to the panoramic image that corresponds to demarcation point C3, the position along the horizontal direction for displaying the annotation of building A is expressed by the following equation when it is represented by a relative angle $\theta_1$ (rad) from the frontal direction of the panoramic image:

$$\theta_1 = \begin{cases} \arctan\left(\frac{y_a}{x_a - x_2}\right)(x_a \neq x_2) \\ \frac{\pi}{2}(x_a = x_2, y_a > 0) - \\ \frac{\pi}{2}(x_a = x_2, y_a < 0) \end{cases} \quad (1)$$

Further, in regard to the panoramic image that corresponds to demarcation point C4, the position along the horizontal direction for displaying the annotation of building A is expressed by the following equation when it is represented by a relative angle $\theta_2$ from the frontal direction of the panoramic image:

$$\theta_2 = \begin{cases} \arctan\left(\frac{y_a}{x_a - x_3}\right)(x_a \neq x_3) \\ \frac{\pi}{2}(x_a = x_3, y_a > 0) - \\ \frac{\pi}{2}(x_a = x_3, y_a < 0) \end{cases} \quad (2)$$

Similarly, in regard to the panoramic image that corresponds to demarcation point (x, 0) on road R3, the position along the horizontal direction for displaying the annotation of building A is expressed by the following equation when it is represented by a relative angle $\theta$ from the frontal direction of the panoramic image:

$$\theta_1 = \begin{cases} \arctan\left(\frac{y_a}{x_a - x}\right)(x_a \neq x) \\ \frac{\pi}{2}(x_a = x, y_a > 0) - \\ \frac{\pi}{2}(x_a = x, y_a < 0) \end{cases} \quad (3)$$

With regard to demarcation points C1, C2 and road R1, the position along the horizontal direction for displaying the annotation of building A is expressed as follows in order to display the annotation relating to building A in front of the panoramic image at all times:

$$\theta = 0 \quad (4)$$

The annotation display position on road R2 will be described next. The annotation relating to building A is displayed in the frontal direction ($\theta=0$) at demarcation point C2, moves gradually in the direction of building A on road R2 and is displayed in the direction of 61 at demarcation point C3. On road R2, the annotation display direction is found by interpolation. In regard to the panoramic image corresponding to point (x, 0) on road R2, the position 0 along the horizontal direction for displaying the annotation of building A is expressed by the following equation:

$$\theta = \frac{\theta_1}{x_2 - x_1} \times (x - x_1) \quad (4)$$

Figure 7A:
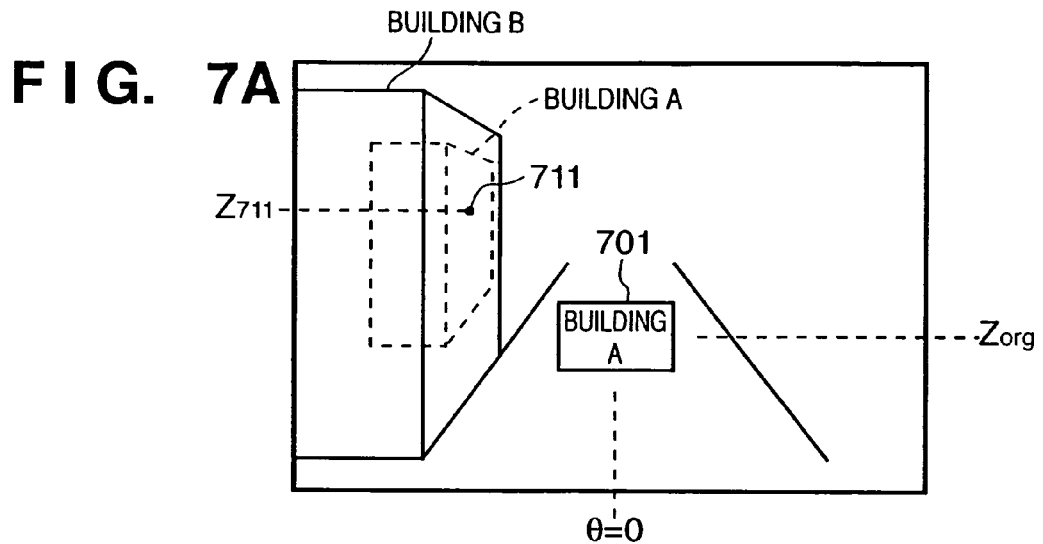
FIGS. 7A to 7C are diagrams illustrating the manner in which annotations are displayed in a first embodiment.
Figure 7B:
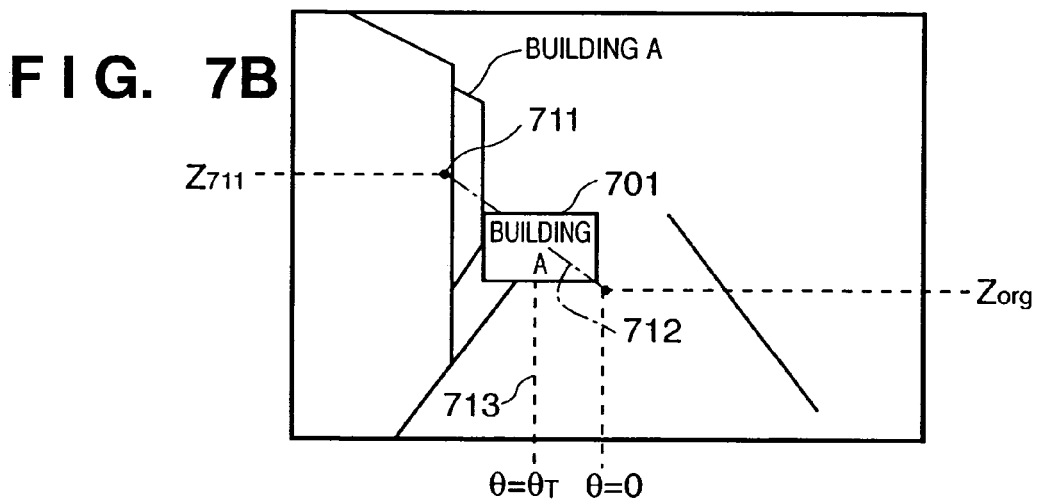
Figure 7C:
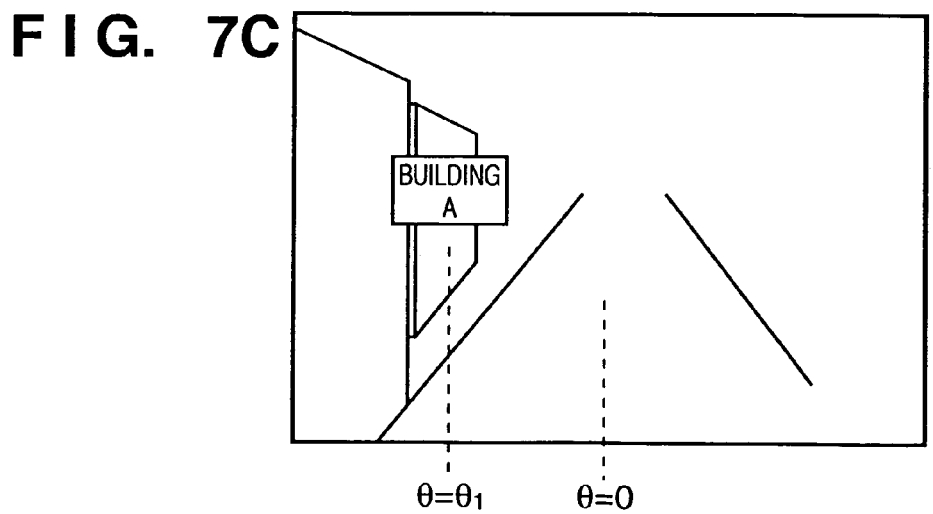

FIGS. 7A to 7C illustrate the manner in which an annotation is displayed. FIG. 7A is an example of a display in the frontal mode. This illustrates the manner in which an annotation is displayed in the direction in front of the panoramic image (the travelling direction), i.e., at the position of $\theta=0$. Let $Z_{org}$ represent the position of the panoramic image along the vertical direction (a position along the Z axis in FIGS. 7A to 7C). More specifically, an annotation 701 is displayed with $\theta=0$, $Z=Z_{org}$ as the center. If the annotation 701 were to be displayed at an original annotation position 711, there is a possibility that this annotation would be misidentified as belonging to building B. By adopting the form of display shown in FIG. 7A, however, such misidentification can be prevented.

When the viewpoint position subsequently reaches demarcation points C2, C3 on road R2, an annotation display in accordance with the interpolation mode is presented and a position in the horizontal direction of the image is decided by $\theta_T$ calculated according to Equation (5), as illustrated in FIG. 7B. It should be noted that the position along the vertical direction is decided by a straight line 712 connecting $Z_{org}$ and the annotation display position 711 of building A prevailing at this time. That is, the annotation 701 is displayed centered on the point of intersection between a straight line 713, which indicates the position $\theta_T$, and the straight line 712. When the viewpoint position moves further onto road R3, the annotation 701 comes to be displayed at the original annotation display position, as illustrated in FIG. 7C.

It should be noted that a position $Z_T$ of the annotation display along the Z direction in the interpolation mode may be found from Equation (6) below [in which x, $x_1$, $x_2$ are the same as in Equation (5)] in a case where $Z_{org}$ represents the display position of the annotation along the Z direction in the frontal mode and $Z_{711}$ represents the display position of the annotation along the Z direction in the object mode:

$$Z_T = \frac{Z_{711} - Z_{org}}{x_2 - x_1} \times (x - x_1) + Z_{org} \quad (6)$$

It should be noted that in a case where the annotation 701 is displayed as shown in FIG. 7A, the annotation may block the field of view (or in other words, there is the possibility that an important image will be concealed by the annotation 701). Accordingly, the annotation 701 may be displayed not at the center of the image but upon being offset upward or downward.

The format in which annotation data is stored is illustrated in FIG. 8. The annotation data is described for every object. Roads for which annotations are displayed and display methods for the roads are described with regard to each object. The display method represents whether the annotation is displayed in the direction in front of the panoramic image (the display state (frontal mode) of FIG. 7A), in the direction of the object (the display state (object mode) of FIG. 7C) or between the frontal direction and the object direction (the display state (interpolation mode) of FIG. 7B).

Figure 9:
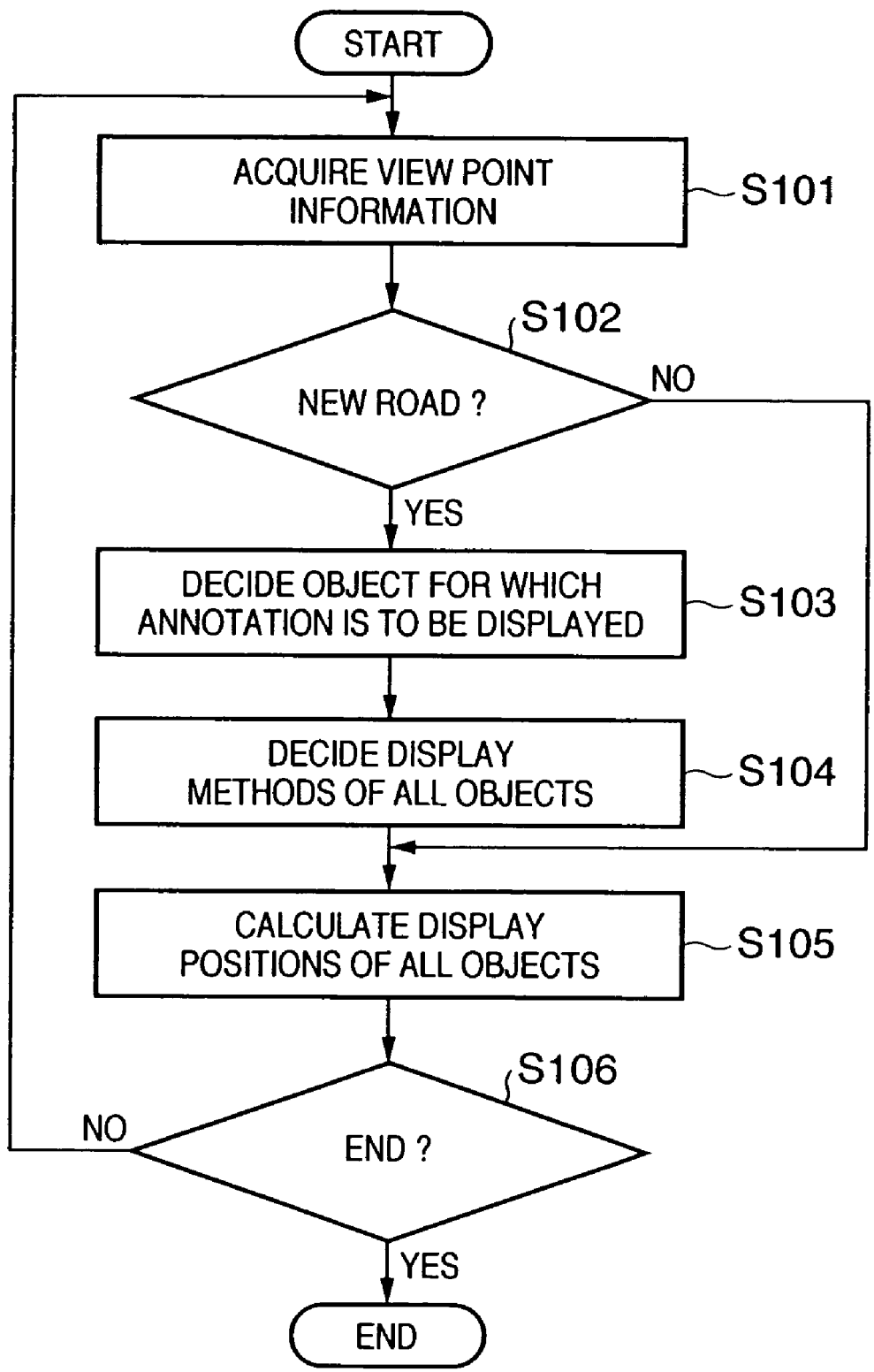
FIG. 9 is a flowchart illustrating the decision of annotation display positions in the annotation display position decision unit.

FIG. 9 is a flowchart for deciding annotation display position in the annotation display position decision unit 50.

First, at step S101, new viewpoint information (viewpoint position, line-of-sight direction) is acquired. Next, at step S102, it is determined whether the road decided from viewpoint information acquired at step S101 is the same road as that of the preceding frame. If the road is a new road, namely one different from that of the preceding frame, control proceeds to step S103. Here the object for which an annotation is to be displayed is decided with regard to the applicable road. In this embodiment, annotations can be displayed for a plurality of objects. For example, if the viewpoint position is road R2 in the case of annotation data of the kind shown in FIG. 8, buildings A and B are decided upon as objects for which annotations are to be displayed. After an object for display of an annotation has been decided at step S103, control proceeds to step S104. Here the method of display for each object is decided from the annotation data shown in FIG. 8. For example, in a case where the viewpoint position is on road R2, the annotation of building A is set to the frontal mode and the annotation of building B is set to the object mode. Control proceeds to step S105. If it is found at step S102 that the road is the same as the preceding road, control proceeds directly to step S105.

In step S105, the annotation display position θ (the relative angle θ from the frontal direction of a panoramic image) for a panoramic image corresponding to the applicable viewpoint position and display method is found with regard to all objects for which annotations are to be displayed. Further, if the display method is that of the interpolation mode, then annotation display position is found by the method described above in conjunction with FIG. 7B. A decision as to whether to end processing is rendered at step S106. If processing is not yet to be ended, then viewpoint information is acquired anew at step S102. In a case where a plurality of annotations are displayed in the frontal mode, it will suffice to display the annotations through a method described in a fourth embodiment, which will be set forth below.

Thus, in accordance with the first embodiment, the position at which an annotation is displayed is changed based upon the relative relationship between a viewpoint position in virtual space and the position of an object, thereby making it possible to prevent an annotation from being confused with another object. Further, which object an annotation is related to can be identified simply and reliably.

Second Embodiment

In the first embodiment, when there is a possibility that the target to which an annotation is to be appended may be misidentified when the annotation is displayed on the object, as in a case where the object to which the annotation is to be appended will be rendered unviewable owing to the position of the viewpoint, such misidentification is prevented by changing the annotation display position. In general, however, an annotation does not include information indicating the distance between an object and a viewpoint position. Consequently, according to the first embodiment, the shape of the annotation displayed in the frontal mode is fixed in the display state shown in FIG. 7A and the observer cannot ascertain whether the object to which the annotation is to be appended is near or far. Accordingly, in a second embodiment, the positional relationship between the observer and an object in virtual space is made ascertainable to the observer by changing the appearance (the style, etc., of the annotation) of the displayed annotation based upon the viewpoint position and object position in virtual space.

Figure 10A:
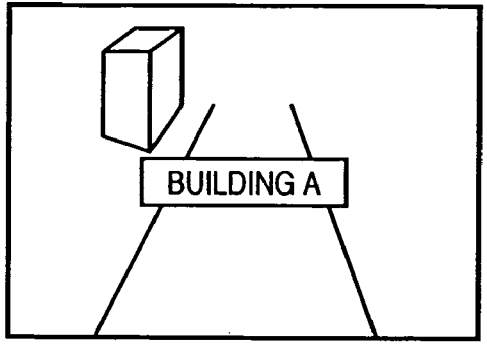
FIGS. 10A to 10C are diagrams illustrating an annotation display method according to a second embodiment of the present invention.
Figure 10A:
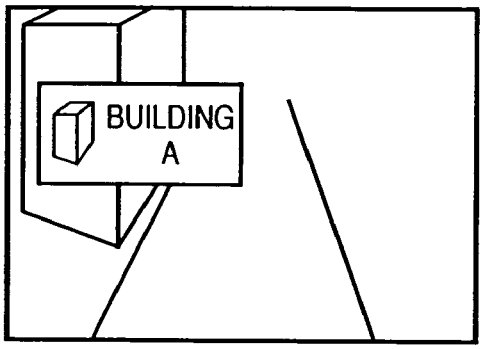
Figure 10B:
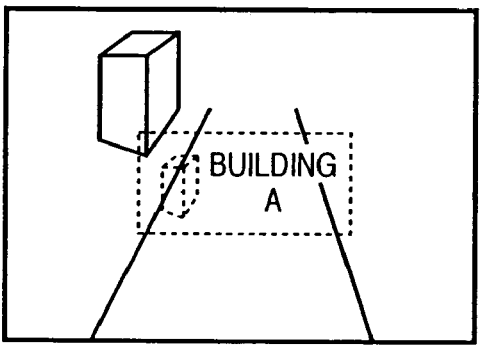
Figure 10B:
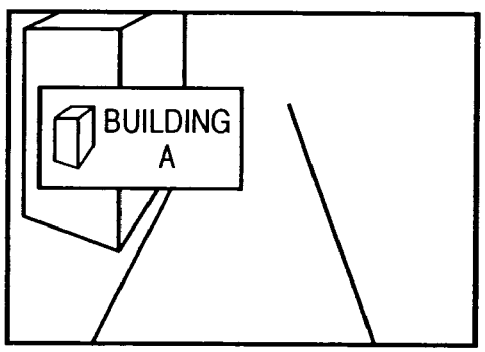
Figure 10C:
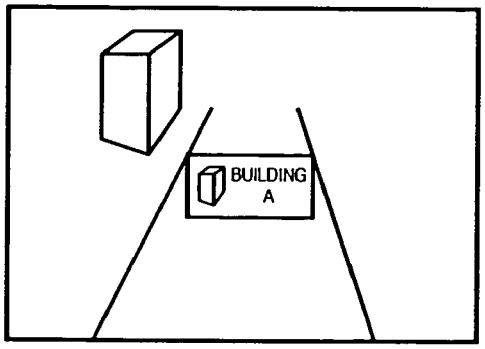
Figure 10C:
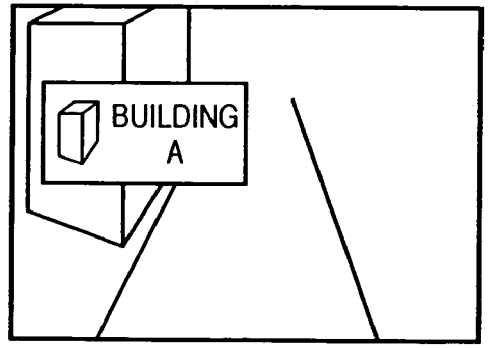

FIGS. 10A to 10C are diagrams illustrating an example of the second embodiment. In FIG. 10A, the form of an annotation (content, shape or size of the display) displayed is changed depending upon whether the annotation is displayed in the direction in front of a panoramic image or on an object. By changing the form of a displayed annotation, the observer can ascertain more clearly whether he has already reached a position at which the object can be observed and is observing the object per se, or has not yet reached the object. This is particularly advantageous because to an observer who observes the object for the first time, the correspondence between the annotation and the object becomes ascertainable more easily. It should be noted that in a case where the annotation is being displayed in the direction in front of the panoramic image, it is possible for the observer to readily grasp the positional relationship between himself and the object by so arranging it that the vertical size of a rectangular frame surrounding the annotation grows gradually larger as the observer approaches the object.

In FIG. 10B, the transparency of the annotation displayed is changed in accordance with the distance between the observer and object in virtual space. Transparency is raised if the annotation is being displayed in the direction in front of the panoramic image and is lowered if it is being displayed on the object. Further, if the annotation is being displayed in the direction in front of the panoramic image, then the transparency of the annotation is lowered gradually as the observer approaches the object, thereby making it possible for the observer to readily ascertain the positional relationship between himself and the object.

In FIG. 10C, the size of the annotation displayed is changed in accordance with the distance between the observer and the object in virtual space. The annotation is displayed in a small size to make it less conspicuous if it is being displayed in the direction in front of the panoramic image and is displayed in a large size to make it more conspicuous if it is being displayed on the object. Further, if the annotation is being displayed in the direction in front of the panoramic image, then it is made gradually larger in size as the observer approaches the object so that the observer can recognize the positional relationship between himself and the object.

Thus, in accordance with the second embodiment, an observer can grasp the positional relationship between himself and an object based upon an annotation by changing the display state of the annotation displayed, such as the shape, transparency or size of the annotation, in accordance with the relative relationship between viewpoint position and object position in virtual space. In other words, by changing the displayed annotation depending upon the relative relationship between the viewpoint position and object position in virtual space, the observer can readily ascertain the positional relationship between himself and the object in virtual space. It should be noted that the distance between the viewpoint position and the object can be calculated depending upon straight-line distance from the viewpoint position to each object in virtual space or depending upon distance on the path.

Further, in the first embodiment, if an object to which an annotation has been appended is viewable, then the annotation is displayed on the object. In a case where the object of interest is far from the viewpoint position, however, the size of the object will be small and there is the possibility that the object will be concealed by the annotation if the annotation is displayed as is. In accordance with the second embodiment, the transparency of the annotation is raised or the size of the rectangular frame of the annotation is reduced if the object of interest is far from the viewpoint position, as in FIGS. 10B and 10C. This is effective in that even if the displayed size of the object of interest is small, it is possible to prevent the object of interest from being hidden by the annotation.

Third Embodiment

In the second embodiment, it is so arranged that the observer is capable of ascertaining the positional relationship between himself and an object by changing the form of an annotation display in accordance with the positional relationship between the viewpoint position and object position in virtual space. In a third embodiment, if an annotation is being displayed in front, as shown in FIG. 7A, road guidance information up to the object that corresponds to the annotation is displayed. As a result, it is so arranged that even if the observer is far from the object (i.e., even if the object cannot be observed), the observer can arrive at the object by relying upon the guidance information provided by the annotation.

FIGS. 11A to 11D are diagrams useful in describing an annotation display operation according to the third embodiment. Here it is assumed that annotations relating to building A are displayed in accordance with a path A→B→C→D displayed on a map in FIG. 11A. It should be noted that since building A is concealed by another building, it can only be observed on the path C→D.

Figure 11A:
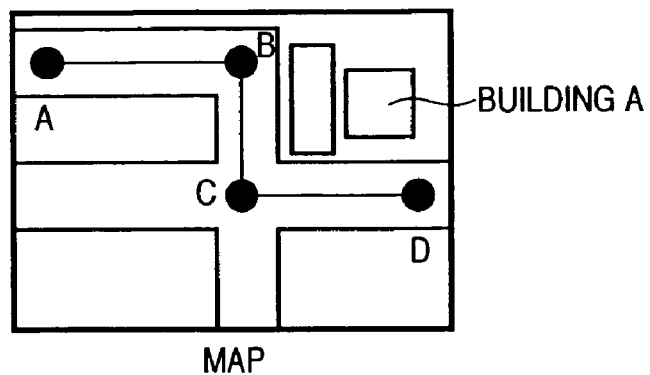
FIGS. 11A to 11D are diagrams for describing an operation relating to the display method according to a third embodiment of the present invention.
Figure 11B:
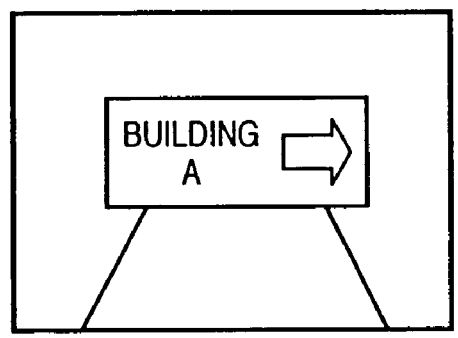
Figure 11C:
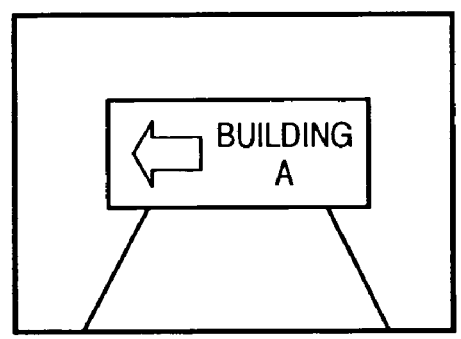
Figure 11D:
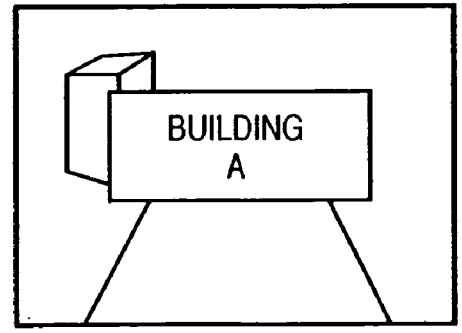

When the observer is facing in the direction toward B on the path A→B, an annotation of the kind shown in FIG. 11B is displayed. Since an arrow prompting the observer to turn right at the next intersection is displayed simultaneously on the annotation, the observer can ascertain the route to building A. Similarly, when the observer is facing in the direction toward C on the path B→C, an arrow prompting the observer to turn left at the next intersection is displayed simultaneously on the annotation, as illustrated in FIG. 11C. Since the building A is observable on path C→D, no particular arrow is displayed on the annotation. It should be noted that there are cases where building A cannot be seen owing to concealment by another building or the like even on path C→D. Accordingly, it may be so arranged that an arrow indicating advance is displayed while building A is not visible (the display state shown in FIG. 7A).

Furthermore, an arrow displayed on the annotation may be combined with the annotation when the route is searched and displayed in real time, or the path to the object may be decided in advance and combined with the annotation image and the resultant image may be read out at the time of display. Further, according to the third embodiment, the travelling direction to be followed at the next intersection is indicated as the method of displaying road-guidance information. However, display may be presented in another form if desired.

Thus, in accordance with the third embodiment, guidance information as to what turn should be made at the next intersection in order to arrive at the object is indicated on an annotation. As a result, even if the observer is remote from the object, the observer can still arrive at the object with ease. That is, by displaying guidance information on an annotation, the observer can arrive at the object by relying upon the guidance information even if the observer is remote from the object.

Fourth Embodiment

In the first embodiment, misrecognition of an object indicated by an annotation is prevented by changing the display position of the annotation depending upon the relative relationship between the viewpoint position and object position in virtual space. This makes it easy for the observer to simply identify with which object the annotation is related. In a fourth embodiment, if a plurality of annotations are displayed in the direction in front of a panoramic image, the annotation of the object closest to the observer is displayed in front, thereby assuring that the observer will not be confused.

Figure 12:
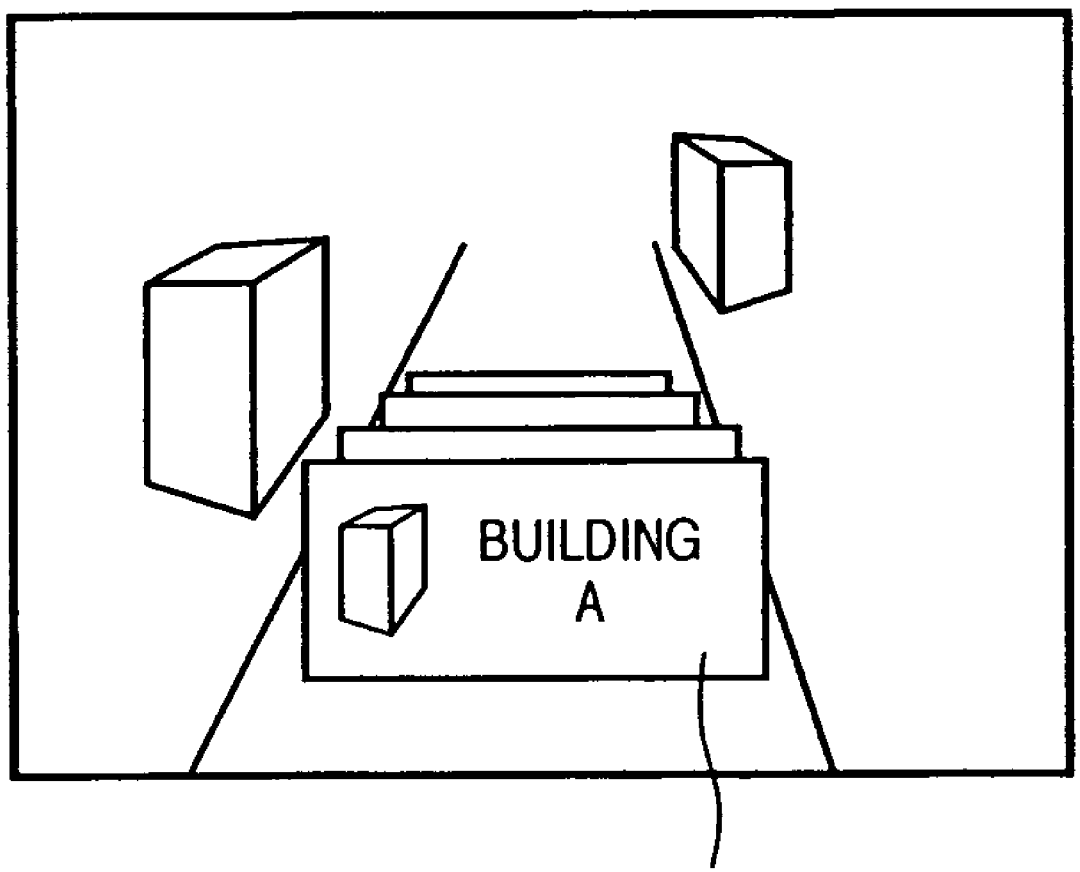
FIG. 12 is a diagram illustrating the manner of an annotation display according to a fourth embodiment of the present invention.

FIG. 12 is a diagram illustrating the manner in which annotations are displayed in the fourth embodiment. As shown in FIG. 12, a plurality of annotations displayed in the direction in front of a panoramic image are arrayed in order of increasing depth. Depth is calculated based upon straight-line distance from the viewpoint position to each object in virtual space or based upon distance on the route. By presenting such a display, the observer can recognize the fact that a plurality of annotations are present and can clearly recognize the annotation of the object that is nearest to the observer.

Figure 13:
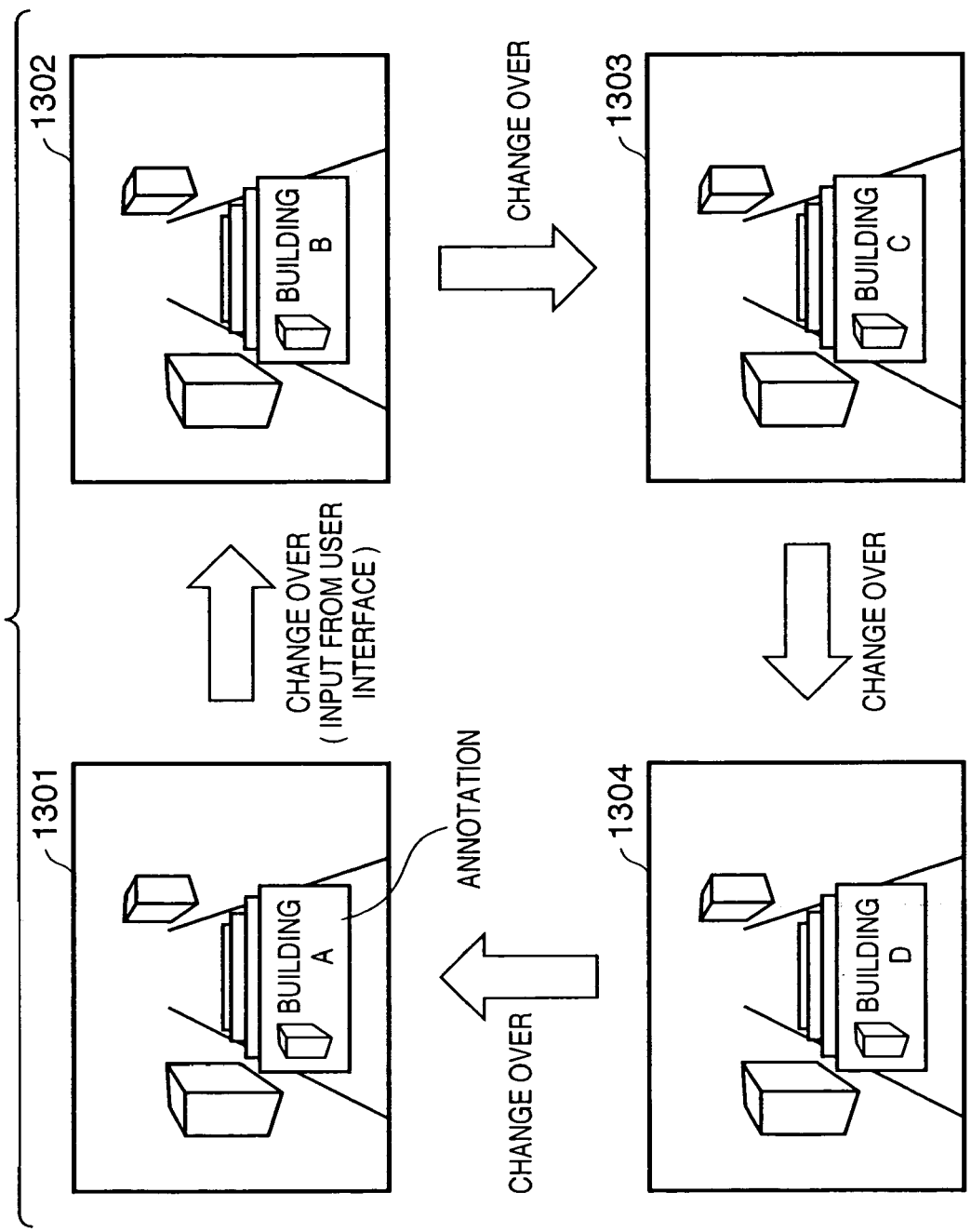
FIG. 13 is a diagram illustrating the manner of an annotation changeover display according to a fifth embodiment of the present invention.

Further, as shown in FIG. 13, annotations that are arrayed in order of increasing depth can be displayed upon being changed over by an input from a user interface. This expedient makes it possible for the observer to ascertain which objects can be observed as the observer advances along the route currently being travelled. The example of FIG. 13 illustrates the manner in which the display is changed over, namely in the order 1301→1302→1303→1304→1301, whenever a changeover command is entered from the user interface in a case where there are four annotations present.

Figure 14:
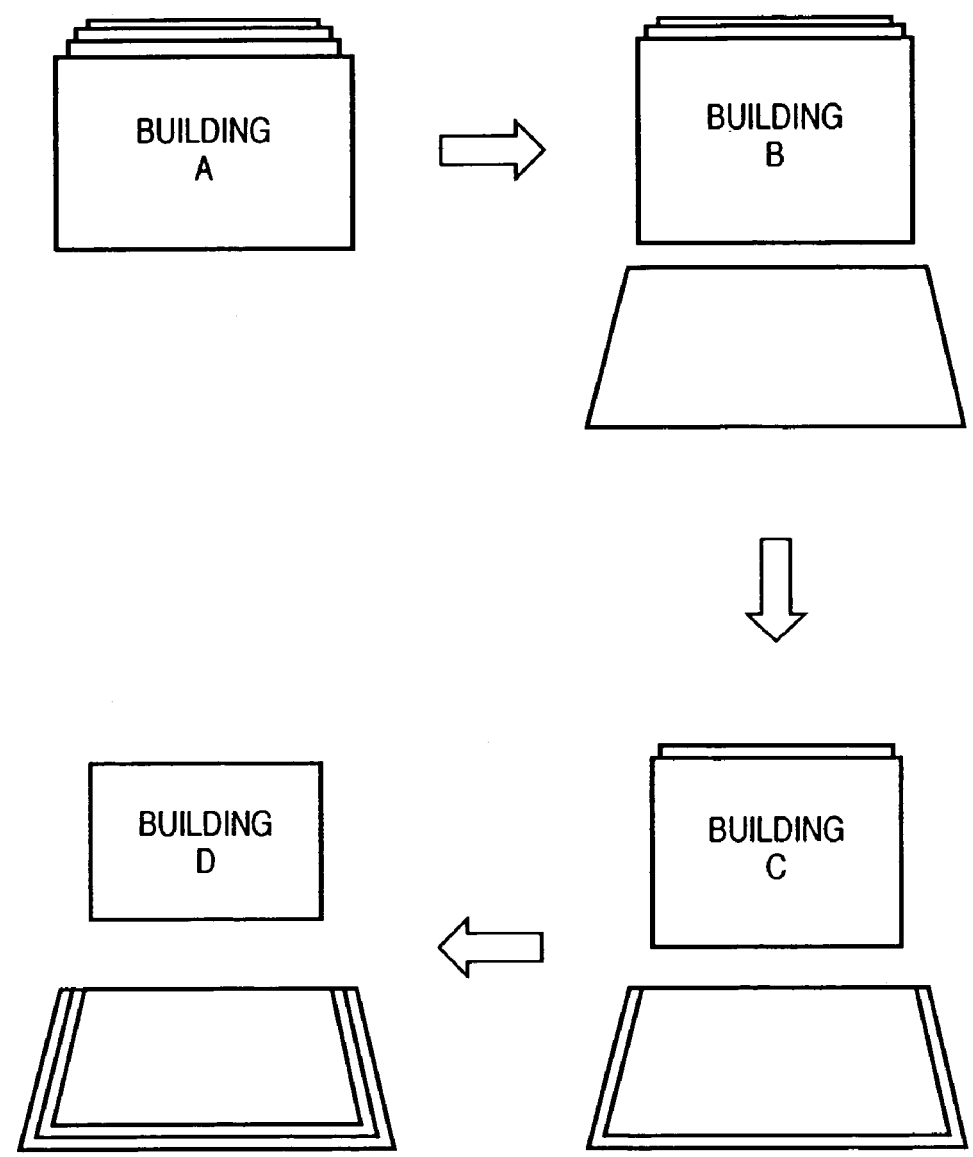
FIG. 14 is a diagram illustrating the manner of an annotation changeover display according to the fifth embodiment.

As shown in FIG. 14, it may be so arranged that when a changeover is made, a display is presented so as to allow the observer to ascertain what number annotation is being indicated among the annotations arrayed in order of increasing depth.

Thus, in accordance with the fourth embodiment, annotations are displayed in order of increasing depth, thereby preventing the observer from becoming confused. Further, by changing over the annotations arrayed in order of increasing depth, the observer can ascertain the objects that will be observable before they are arrived at by the observer.

It goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-389659 filed on Nov. 19, 2003, which is hereby incorporated by reference herein.

What is claimed is:

1. An image reproducing method for displaying an image of a virtual space corresponding to a viewpoint and displaying an annotation relating to an object in the virtual space, said method comprising:
   a storing step of storing an image in association with a road defined in the virtual space;
   a first acquisition step of acquiring definition information used for controlling a display position of an annotation, wherein the definition information indicates, with respect to each annotation, an object, the road in the virtual space, and a mode of controlling a display position of an annotation when a viewpoint is in the road;
   a second acquisition step of acquiring a viewpoint position;
   a decision step of deciding, based on the viewpoint position, an object for which an annotation is displayed;
   a determination step of, with reference to the definition information, determining one of a plurality of modes corresponding to the object decided in said decision step, based on a road in which the viewpoint position acquired in said second acquisition step exists;
   a calculation step of calculating a display position of an annotation corresponding to the object decided in said decision step in accordance with the mode determined in said determination step, and
   a selecting step of selecting an image corresponding to the viewpoint position from images and superimposing the annotation on the calculated display position of the selected image;
   wherein the plurality of modes include:
   a first mode for displaying the annotation at a predetermined display position that does not correspond to a location of an object;
   a second mode for displaying the annotation at a display position that corresponds to the location of the object; and
   a third mode for displaying the annotation at a display position corresponding to the viewpoint position which is interpolated based on a display position of the annotation when the viewpoint position is at a start point on the road, a display position of the annotation when the viewpoint position is at an end point on the road, and a current position of the viewpoint position is in the road, wherein
   each of the steps is implemented on a computer.

2. The method according to claim 1, further comprising a display form determination step of determining the display form of the annotation.

3. The method according to claim 1, further comprising a display form determination step of determining the display form of the annotation based upon distance between the viewpoint position and the object in the first mode.

4. The method according to claim 1, wherein the image of annotation in the first mode contains image of route guidance.

5. The method according to claim 1, wherein if a plurality of annotations to be displayed in the first mode exist, the plurality of annotations are displayed from the front in order starting from an annotation of the object that is closest to the viewpoint position in virtual space.

6. An image reproducing apparatus for displaying an image of virtual space corresponding to a viewpoint and displaying an annotation relating to an object in the virtual space, said apparatus comprising:
   a storing unit to store an image in association with a road defined in the virtual space;
   a storage unit configured to store definition information used for controlling a display position of an annotation, wherein the definition information indicates, with respect to each annotation, an object, the road in the virtual space, and a mode of controlling a display position of an annotation when a viewpoint is in the related position;
   an acquisition unit configured to acquire a viewpoint position; and
   an annotation display position decision unit which executes:
   deciding, based on the viewpoint position, an object for which an annotation is displayed;
   selecting, with reference to the definition information, one of a plurality of modes corresponding to the decided object, based on a road in which the viewpoint position acquired by said acquisition unit exists;
   calculating a display position of an annotation corresponding to the selected object in accordance with the selected mode, and
   selecting an image corresponding to the viewpoint position from the stored images and superimposing the annotation on the calculated display position of the selected image;
   wherein the plurality of modes include:
   a first mode for displaying the annotation at a predetermined display position that does not correspond to a location of an object;
   a second mode for displaying the annotation at a display position that corresponds to the location of the object; and
   a third mode for displaying the annotation at a display position corresponding to the viewpoint position which is interpolated based on a display position of the annotation when the viewpoint position is at a start point on the road, a display position of the annotation when the viewpoint position is at an end point on the road, and a current position of the viewpoint position is in the road.

7. A storage medium storing a control program for causing the image reproducing method set forth in claim 1 to be executed by a computer.

* * * * *